United States Patent [19]

Schuhmann et al.

[11] Patent Number: 5,492,757
[45] Date of Patent: Feb. 20, 1996

[54] OPAQUE, MATTE, MULTILAYER POLYPROPYLENE FILM, PROCESS FOR THE PRODUCTION THEREOF, AND THE USE THEREOF

[75] Inventors: Detlef E. Schuhmann, Kiedrich; Adolf Wilhelm, Wiesbaden; Ursula Murschall, Nierstein; Herbert Peiffer, Mainz; Wolfgang Meyer, St. Ingbert, all of Germany

[73] Assignee: Hoechst Aktiengesellschaft, Frankfurt, Germany

[21] Appl. No.: 222,936

[22] Filed: Apr. 5, 1994

[30] Foreign Application Priority Data

Apr. 10, 1993 [DE] Germany .................... 43 11 950.6

[51] Int. Cl.⁶ ................................................ B32B 5/16
[52] U.S. Cl. .................... 428/329; 428/403; 428/349; 428/317.9; 428/516; 428/353; 428/34.7; 428/461
[58] Field of Search .................................... 428/349, 516, 428/329, 403, 317.9

[56] References Cited

U.S. PATENT DOCUMENTS

| | | | |
|---|---|---|---|
| 4,297,415 | 10/1981 | Ward et al. ........................ | 428/516 |
| 4,375,989 | 3/1983 | Mäkinen ........................... | 106/300 |
| 4,419,411 | 12/1983 | Park ................................. | 428/516 |
| 4,447,271 | 5/1984 | Howard et al. ..................... | 106/300 |
| 4,578,316 | 3/1986 | Clauson et al. .................... | 428/516 |
| 4,582,752 | 4/1986 | Duncan ............................ | 428/317.9 |
| 4,622,237 | 11/1986 | Lori ................................. | 427/40 |
| 4,698,261 | 10/1987 | Bothe et al. ....................... | 428/204 |
| 4,855,187 | 8/1989 | Osgood, Jr. et al. ................ | 428/516 |
| 4,906,637 | 10/1990 | Biczenczuk ........................ | 428/314.4 |
| 4,927,675 | 5/1990 | Adams et al. ...................... | 428/35.9 |
| 5,326,625 | 7/1994 | Schulmann et al. ................. | 428/516 |

FOREIGN PATENT DOCUMENTS

| | | |
|---|---|---|
| 0236945 | 9/1987 | European Pat. Off. . |
| 4135096 | 4/1993 | Germany . |
| 1145199 | 3/1969 | United Kingdom . |
| 2201407 | 9/1988 | United Kingdom . |

OTHER PUBLICATIONS

Loos, Hansl, "Farbmessung" (Color Measurement), Verlag Beruf and Schule, Itzehoe (1989).

Ullmanns Encyklopädie der techn. Chemie (Ullmann's Encyclopedia of Industrial Chemistry), 4th Edition, vol. 12, pp. 525 to 555.

Patent Abstracts of Japan, vol. 016, No. 306 (M–1276)6. Jul. 1992, & JP–A–04 086 260 Abstract (Toyo Seikan K. Ltd.) 18 Mar. 1992.

Database WPI, Week 9141, Derwent Publications Ltd., London, GB; AN 91–298804 Abstract & JP–A–3 197 541 (Idenitsu Petrochem KK) 28. Aug. 1991.

*Primary Examiner*—Edith Buffalow
*Attorney, Agent, or Firm*—Foley & Lardner

[57] ABSTRACT

The invention relates to an opaque, matte, multilayer polypropylene film having at least one matte surface which includes at least one base layer and at least one interlayer, and an outer layer applied to this interlayer. The base layer includes polypropylene and fillers. The interlayer includes a mixture or blend of two components I or II. Component I is a propylene homopolymer or a copolymer of α-olefins having 2 to 10 carbon atoms, or a terpolymer of α-olefins having 2 to 10 carbon atoms or a mixture or blend of said polymers. Component II is an HDPE or a blend of HDPE and a propylene homopolymer or a copolymer of α-olefins having 2 to 10 carbon atoms or a terpolymer having 2 to 10 carbon atoms. The outer layer essentially includes a propylene homopolymer or a copolymer of α-olefins having 2 to 10 carbon atoms or a terpolymer of α-olefins having 2 to 10 carbon atoms or a mixture or blend of said polymers.

34 Claims, No Drawings

OPAQUE, MATTE, MULTILAYER POLYPROPYLENE FILM, PROCESS FOR THE PRODUCTION THEREOF, AND THE USE THEREOF

BACKGROUND OF THE INVENTION

1. Field of the Invention

The invention relates to an opaque, multilayer polypropylene film which comprises at least one base layer containing polypropylene or a polypropylene mixture and fillers, having at least one interlayer and at least one outer layer applied to this interlayer.

The film according to the invention is distinguished by a characteristic matte appearance.

The invention furthermore relates to a process for the production of the multilayer film and to products made from the film.

2. Description of Related Art

German Patent Application P 41 35 096.0 discloses multilayer polyolefin films comprising a polypropylene base layer and an outer layer made from an HDPE blend. This HDPE blend comprises HDPE and copolymers and/or terpolymers made from α-olefins and, if desired, polypropylene. The outer layer of the multilayer film has minimum sheen and maximum haze, giving the film a characteristic matte appearance.

DE-A-16 94 694 discloses multilayer films which comprise biaxially oriented polypropylene films and at least one heat-sealable layer made from an ethylene-propylene copolymer. This films have good heat-sealability and are clear. However, the films have inadequate scratch resistance and unsatisfactory processing properties in high-speed packaging machines.

EP-A-0 008 904 discloses a biaxially oriented three-layer polyolefin film which is heat-sealable on both sides and in which the base layer is formed from propylene polymers and the two heat-sealable layers are formed from heat-sealable olefin polymers. However, this polyolefin film is transparent and, in particular, has only low scratch resistance and is not printable. In addition, its sliding properties are unsatisfactory in high-speed packaging machines.

A further biaxially oriented three-layer polyolefin film which is heat-sealable on both sides is disclosed in U.S. Pat. No. 4,419,411. The two heat-sealable layers in these films incorporate polysiloxane and silicon dioxide as an additive combination. The base layer essentially comprises polypropylene and contains a small amount of a monocarboxamide, which partially migrates from the base layer into the two heat-sealable layers. The multilayer polyolefin film disclosed is said to have a particularly low coefficient of friction. The disadvantage of the film is that it is not printable.

U.S. Pat. No. 4,578,316 discloses a biaxially oriented multilayer polyolefin film whose base layer comprises a polypropylene homopolymer and whose outer layer comprises a blend of polypropylene and MDPE and/or HDPE. This polyolefin film has a low coefficient of friction together with a readily wettable surface; however, the disadvantage of this film is that it has excellent optical transparency.

WO 89/10839 describes multilayer polyolefin films whose base layer comprises a polypropylene polymer and whose outer layers comprise either HDPE or an ethylene-propylene copolymer or a polypropylene, the film being stretched under particular temperature conditions. It has, in particular, a low coefficient of friction and good wettability, but also has the disadvantage of high sheen and low haze.

EP-A-0 367 613 discloses a multilayer film comprising a vacuole-containing polypropylene base layer and an inscribable outer layer which contains a first polymer having a melt-flow index of $\leq 1$ g/10 min and a second polymer which is incompatible with said first polymer, with incompatible meaning that the two polymers are present as separate phases. An example given of the first polymer is an HDPE having a density of from 0.92 to 0.97 g/cm$^3$. The incompatible polymer is a polypropylene or a copolymer of propylene or a terpolymer of propylene. The film described has an opaque appearance, i.e., it is essentially non-transparent to light. It is also disclosed that the film acquires a matte appearance if it is provided with a print. Additionally, it is preferred to incorporate a filler such as SiO$_2$ into the outer layer to improve the inscribability. The SiO$_2$-containing outer layer is also very matte, which gives the film a paper-like appearance. The film described has a density of 0.69 g/cm$^3$. The disadvantage is that the matte, SiO$_2$-containing surface proves to be unsatisfactory on printing. This is due to foggy color which does not have a uniform appearance. The foggy color is attributed to inhomogeneities which, due to their opacity, do not appear particularly strongly in the film itself, but come out during printing. The printed films are spotty and are not accepted by a film processor.

Many known films have the disadvantage of chalking, i.e., the films become covered after a few days by a layer of dust, comprising particles not originating from the environment, but from the film itself, in particular from the films outer layers.

All known films are unsatisfactory with respect to their economic advantages and their possible variations. The appearance of conventional films can be varied by suitable measures; for example, the whiteness of a film can be increased by incorporating TiO$_2$ into the outer layer. However, such modifications generally do not result only in the desired change, but inevitably affect other film properties. For example, TiO$_2$ in the outer layer changes not only the whiteness but also the roughness and thus the running properties of the film. These side-effects, some of which are very undesirable, result in the processor having to re-optimize the processing conditions for each film type, i.e., resetting packaging machines individually or modifying printing ink compositions, etc. Such necessary measures have previously been regarded as matter of course and unavoidable.

SUMMARY OF THE INVENTION

One object of the present invention is to provide a multilayer film which has a matte appearance. The gloss of the film should be optimized with respect to this desired matte characteristic. At the same time, a homogeneous film appearance without interfering spots or streaks is important. In addition, good surface properties, particularly high, long-lasting surface tension of the outer layer, are required so that superior printability of the film is ensured along with a uniform appearance of the print.

Depending on its application, another object of the present invention is to provide a film which additionally has good sealing properties, in particular a broad sealing range and good heat-sealability. Another object of the invention is to provide a film having good running properties and low friction for use in high-speed packaging machines.

It is still another object of the present invention to provide a process for the production of the multilayer film by a coextrusion process. Another object of the present invention is to provide a laminate, a packaging material, a coated barrier system, and a label which include the multilayer film.

In accomplishing the foregoing objects, there has been provided according to one aspect of the present invention an opaque, multilayer polypropylene film having at least one matte surface comprising at least one base layer containing polypropylene or a polypropylene mixture and fillers, at least one interlayer and at least one outer layer applied to the interlayer.

The outer layer is selected from the group consisting of a propylene homopolymer, copolymers of α-olefins having 2 to 10 carbon atoms, terpolymers of α-olefins having 2 to 10 carbon atoms, a mixture of two or more said homopolymers, copolymers and terpolymers, a blend of two or more said homopolymers, copolymers and terpolymers, and a blend of two or more said homopolymers, copolymers and terpolymers mixed with one or more said homopolymers, copolymers and terpolymers.

The interlayer comprises a mixture or blend of two components I and II, wherein component I is selected from the group consisting of a propylene homopolymer, a copolymer of α-olefins having 2 to 10 carbon atoms, a terpolymer of α-olefins having 2 to 10 carbon atoms, a mixture of two or more said homopolymers, copolymers and terpolymers, and a blend of two or more said homopolymers, copolymers and terpolymers, Component II is selected from the group consisting of high-density polyethylene (HDPE) and a blend of two components A and B, wherein blend component A is essentially an HDPE and blend component B is selected from the group consisting of propylene homopolymers, copolymers of α-olefins having 2 to 10 carbon atoms, terpolymers of α-olefins having 2 to 10 carbon atoms, a mixture of two or more said homopolymers, copolymers and terpolymers, and a blend of said homopolymers, copolymers and terpolymers.

Preferably, the outer layer is selected from the group consisting of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixtures or blends thereof, and a blend of two or more said homopolymers, copolymers and terpolymers, mixed with one or more said homopolymers, copolymers and terpolymers.

Preferably, the interlayer comprises a mixture or a blend of two components I and II, wherein component I is selected from the group consisting of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixture or blends thereof, and a blend of two or more said homopolymers, copolymers and terpolymers, mixed with one or more said homopolymers, copolymers and terpolymers.

Component II is selected from the group consisting of an HDPE or a blend of two components A and B, wherein blend component A is an HDPE and blend component B is selected from the group consisting of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixtures or blends thereof.

In a preferred embodiment, the HDPE has an MFI of greater than about 1 to 50 g/10 min, a viscosity index of from about 100 to 450 $cm^3/g$, a density from about 0.93 to 0.97 $g/cm^3$, a degree of crystallization from about 35 to 80% and a melting point of about 120° to 150° C.

In a further preferred embodiment, the fillers of the base layer comprise vacuole-inducing solid particles, preferably $CaCO_3$ or incompatible polymers and/or a pigment, preferably $TiO_2$.

In another preferred embodiment the interlayer further comprises solid particles and/or a pigment as fillers.

The present invention also provides a process for the production of the multilayer polypropylene film comprising the steps of coextruding the melts corresponding to the individual layers of the film through a flat-film die, taking the coextruded film off over a take-off roll whose temperature is between about 20° and 100° C., biaxially stretching the film at a longitudinal stretching ratio from about 4:1 to 7:1 and a temperature of about 120° to 150° C. and a transverse stretching ratio from about 8:1 to 11:1 and a temperature of about 155° to 190° C., heat-setting the biaxially stretched film, optionally corona-treating the heat-set film and subsequently winding up the film.

The present invention also provides among other things the following products: a laminate comprising the multilayer polypropylene film laminated with a material selected from the group consisting of paper, cardboard, metals, metallized plastic films, or plastic films; a packaged article comprising the multilayer polypropylene film surrounding at least in part an article; a coated barrier system comprising the multilayer polypropylene film and an aqueous coating; a label comprising the multilayer polypropylene film shaped in the configuration of a label.

Further objects, features and advantages of the present invention will become apparent to those of ordinary skill in the art from the detailed description of preferred embodiments which follows.

DETAILED DESCRIPTION OF THE PREFERRED EMBODIMENTS

The present invention comprises a multilayer film of the generic type described above where component I of the interlayer preferably comprises a propylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

Component II preferably comprises an HDPE or a blend of two blend components A and B, where
blend component A is essentially an HDPE and
blend component B is essentially
  a propylene homopolymer or
  a copolymer of
    ethylene and propylene or
    ethylene and butylene or
    propylene and butylene or
    ethylene and another α-olefin having 5 to 10 carbon atoms or
    propylene and another α-olefin having 5 to 10 carbon atoms or
  a terpolymer of
    ethylene and propylene and butylene
    ethylene and propylene and another α-olefin having 5 to 10 carbon atoms or
  a mixture of two or more of said homopolymers, copolymers and terpolymers or
  a blend of two or more of said homopolymers, copolymers and terpolymers.

For the purposes of the present invention, mixtures are taken to mean mechanical mixtures prepared from the individual components. Generally, the individual constituents are combined as small compression moldings, for example lenticular, spherical or rod-shaped granules, and mechanically mixed using a suitable vibrating device.

For the purposes of the present invention, a blend is an alloy-like compound of the individual components which cannot be re-separated into the original constituents. A blend has similar properties to a homogeneous material and can be characterized correspondingly by suitable parameters.

Films according to the invention prepared from a mixture of polymers are characterized by a less homogeneous appearance than films prepared from polymer blends.

The base layer of the multilayer film according to the present invention essentially comprises a propylene polymer or a polypropylene mixture and fillers.

The propylene polymer of the base layer comprises predominantly (at least about 90%) propylene and has a melting point from about 140° C. or above, preferably from about 150° to 170° C. Isotactic homopolypropylene having an n-heptane-soluble content of about 6% by weight or less, based on the isotactic homopolypropylene, copolymers of ethylene and propylene having an ethylene content of about 10% by weight or less, copolymers of propylene with $C_4$–$C_8$-α-olefins having an α-olefin content of about 10% by weight or less are preferred propylene polymers for the base layer, with isotactic homopolypropylene being particularly preferred. The percentages by weight stated relate to the particular copolymer. The propylene polymer of the core layer generally has a melt-flow index from about 0.5 g/10 min to 8 g/10 min, preferably from about 2 g/10 min to 5 g/10 min at 230° C. and a force of 21.6N (DIN 53 735).

Also suitable is a mixture of said propylene homopolymers and/or copolyers and/or other polyolefins which are compatible with the propylene polymers, in particular having 2 to 6 carbon atoms, where the mixture contains at least about 50% by weight, in particular at least about 75% by weight, of propylene polymer. Other polyolefins which are suitable in the polymer mixture are compatible polyethylenes, in particular HDPE, LDPE and LLDPE, where the proportion of these polyolefins is in each case at most about 15% by weight, based on the polymer mixture. "Compatible" for the purposes of the present invention means that the compatible polymers are not present as separate phases in the film.

The propylene polymer employed in the base layer may be partially degraded by addition of organic peroxides. A measure of the degree of degradation of the polymer is the degradation factor A, which gives the relative change in the melt-flow index of the polypropylene, based on the starting polymer, measured in accordance with DIN 53 735.

$$A = \frac{MFI_2}{MFI_1}$$

$MFI_1$=melt-flow index of the propylene polymer before addition of the organic peroxide $MFI_2$=melt-flow index of the propylene polymer degraded by peroxide.

In general, the degradation factor A of the propylene polymer employed is in the range from about 3 to 15, preferably from about 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy)hexane and di-t-butyl peroxide.

The polypropylene base layer generally contains fillers in an amount from about 1 to 30% by weight which makes the film opaque. For the purposes of the present invention, "opaque film" means a non-transparent film whose transparency to light (ASTM-D 1003-77) is at most about 30%, preferably at most about 50%.

For the purposes of the present invention, the term "fillers" is taken to mean vacuole-forming solid particles, referred to below as "solid particles", and pigments. Solid particles are incompatible with the polymer matrix and result in the formation of vacuole-like cavities when the film is stretched. The size, type and number of the vacuoles are dependent on the size of the solid particles and the stretching conditions, such as stretching ratio and stretching temperature. The vacuoles give the films a characteristic pearl-like opaque appearance, caused by light scattering at the "vacuole-polymer matrix" interfaces. Light scattering at the solid particles themselves generally contributes comparatively little to the opacity of the film. In general, solid particles have a minimum size of about 1 μm in order to give an effective, i.e., opacifying, size and number of vacuoles. In general, the mean particle size of the solid particles is from about 1 to 6 μm, preferably from about 1.5 to 5 μm. The chemical character of the solid particles plays a minor role.

Pigments are likewise incompatible with the polymer matrix and include fillers which result in virtually no vacuole formation on stretching. The coloring action of the pigments is caused by the pigments themselves. The term "pigment" is generally associated with a particle size from about 0.01 μm to a maximum of about 1 μm and covers both so-called "white pigments", which color the films white, and "colored pigments" which give the film a colored or black color. In general, the mean particle size of the pigments is in the range from about 0.01 to 1 μm, preferably from about 0.01 to 0.5 μm.

The division of the fillers into the two groups "solid particles" and "pigments" is therefore a classification by functionality, which depends, inter alia, on the particle size. Solid particles make films opaque due to vacuole formation. Pigments actually color the film and thus make it non-transparent. Particles of both types are covered by the generic term "fillers".

Conventional fillers in the base layer are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide. Calcium carbonate, silicon dioxide and titanium dioxide are especially preferred. Suitable organic fillers are the conventional polymers which are incompatible with the polymer of the base layer, in particular those such as HDPE, polyesters, polyesters, styrenes, polyamides and halogenated organic polymers. Polyesters, such as polybutylene terephthalates are especially preferred. For the purposes of the present invention, "incompatible the materials or incompatible polymers" is taken to mean that the material or polymer is in the form of a separate particle or a separate phase in the film.

The amount of filler in the base layer is generally in the range from about 1 to 30% by weight. Individual embodiments according to the present invention, may contain only solid particles or only pigments or a combination of solid particles and pigments in the base layer, depending on the intended application of the film or the current fashion.

Films provided only with pigment (pigmented films) generally contain pigment in an amount from about 2 to 25% by weight, preferably from about 3 to 20% by weight, more preferably from about 5 to 15% by weight, in each case based on the weight of the base layer. Preferred pigments are white pigments, particularly $TiO_2$ and $BaSO_4$. $TiO_2$ preferably has a mean particle diameter from about 0.01 to 0.7 μm, particularly from about 0.1 to 0.5 μm.

Films provided only with vacuole-inducing solid particles generally contain these particles in an amount of about 1 to 25% by weight. For general packaging films, a content of solid particles from about 2 to 5% by weight is preferred. For specific applications, for example films for labels, highly filled films containing from about 9 to 14% by weight of solid particles are also preferred. Preferred vacuole-inducing particles are $CaCO_3$, $SiO_2$, polyamides and polybutylene terephthalates. Particular preference is given to $CaCO_3$, particularly $CaCO_3$ having a mean particle size from about 1.5 to 5 μm.

Films provided with both vacuole-inducing solid particles and pigment contain solid particles in an amount from about 1 to 10% by weight, preferably from about 1 to 5% by weight. Pigment is present in an amount from about 1 to 7% by weight, preferably from about 1 to 5% by weight. For films of these types, a combination of $CaCO_3$ as solid particles and $TiO_2$ as pigment is preferred. This type of film is also known as opaque white film.

The density of the filler-containing films can vary within broad limits and depends on the type and amount of fillers. The density is generally in the range from about 0.4 to 1.1 $g/cm^3$.

Pigmented films have a density in the order of about 0.9 $g/cm^3$ or above, since the pigments generate virtually no density-reducing vacuoles, but the pigments themselves can have a higher density than polypropylene. The density of films of this type is preferably in the range from about 0.9 to 1.1 $g/cm^3$.

Films containing only solid particles have, due to the vacuoles, a reduced density as compared with polypropylene of less than about 0.9 $g/cm^3$. For packaging films having a content of solid particles of from about 2 to 5% by weight, the density is in the range from about 0.7 to 0.85 $g/cm^3$. For highly filled films having a content of solid particles from about 9 to 14% by weight, the density is in the range from about 0.4 to 0.7 $g/cm^3$.

Films containing both pigments and solid particles, in particular white opaque films, have a density in the range from about 0.6 to 0.85 $g/cm^3$, depending on the ratio between the pigment content and the content of solid particles.

Preferred embodiments of the pigmented films contain $TiO_2$ as white pigment. $TiO_2$ is likewise preferred for white opaque film types. The titanium dioxide particles preferably comprise at least about 95% by weight of rutile and are preferably coated with inorganic oxides. The oxides employed are usually used as coatings for $TiO_2$ in papers or paints in order to improve the light fastness. Particularly suitable inorganic oxides include the oxides of aluminum, silicon, zinc and magnesium or mixtures of two or more of these compounds. They are precipitated from water-soluble compounds, for example alkali metal aluminate, in particular sodium aluminate, aluminum hydroxide, aluminum sulfate, aluminum nitrate, sodium silicate or silicic acid, in aqueous suspension. Coated $TiO_2$ particles are described, for example, in EP-A-0 078 633 and EP-A-0 044 515, the disclosures of which are hereby incorporated by reference.

The coating may also contain organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from about 1 to 12 g, particularly from about 2 to 6 g, of inorganic oxides. Additionally, from about 0.5 to 3 g, particularly from about 0.7 to 1.5 g, of organic compounds can be used if desired. The above weights are based on 100 g of $TiO_2$ particles. It has proven particularly advantageous for the $TiO_2$ particles to be coated with $Al_2O_3$ or with $Al_2 O_3$ and polydimethylsiloxane.

The base layer may furthermore contain a low-molecular-weight resin in a proportion from about 1 to 30% by weight, preferably from about 2 to 10% by weight. The softening point of the resin is between about 130° and 180° C. (measured in accordance with DIN 1995-U4, corresponding to ASTM E-28), preferably between about 140° and 160° C. Of the numerous low-molecular-weight resins, hydrocarbon resins are preferred, in particular in the form of petroleum resins, styrene resins, cyclopentadiene resins and terpene resins to these resins are described in Ullmanns Encyklopädie der techn. Chemie [Ullmann's Encyclopedia of Industrial Chemistry], 4th Edition, Volume 12, pages 525 to 555). Suitable petroleum resins are described in numerous publications, such as, for example, EP-A-0 180 087, which reference is expressly incorporated herein in its entirety.

The multilayer film according to the present invention contains at least one interlayer comprising a mixture or a blend of two components I and II described below in greater detail. If desired, fillers and/or additives may be added.

Component I of the interlayer mixture or of the blend comprises
 a propylene homopolymer or
 a copolymer of
  ethylene and propylene or ethylene and butylene or
propylene and butylene or
ethylene and another α-olefin having 5 to 10 carbon atoms or
propylene and another α-olefin having 5 to 10 carbon atoms or
a terpolymer of
ethylene and propylene and butylene or
ethylene and[propylene and another α-olefin having 5 to 10 carbon atoms or
a mixture of two or more of said homopolymers, copolymers and terpolymers or
a blend of two or more of said homopolymers, copolymers and terpolymers, if desired mixed with one or more of said homopolymers, copolymers and terpolymers.

In a preferred embodiment, component I comprises
a propylene homopolymer or
a copolymer of
ethylene and propylene or
ethylene and 1-butylene or
propylene and 1-butylene or
a terpolymer of
ethylene and propylene and 1-butylene or
a mixture of two or more of said homopolymers, copolymers and terpolymers or
a blend of two or more of said homopolymers, copolymers and terpolymers, if desired mixed with one or more of said homopolymers, copolymers and terpolymers,
with particular preference being given to propylene homopolymers or
random ethylene-propylene copolymers having
an ethylene content from about 2 to 10% by weight, preferably from about 5 to 8% by weight, or
random propylene-1-butylene copolymers having
a butylene content from about 4 to 25% by weight, preferably from about 10 to 20% by weight,
in each case based on the total weight of the copolymer, or
random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
in each case based on the total weight of the terpolymer, or
blend of an ethylene-propylene-1-butylene terpolymer and a propylene-1-butylene copolymer having an ethylene content from about 0.1 to 7% by weight
and a propylene content from about 50 to 90% by weight
and a 1-butylene content from about 10 to 40% by weight,
is in each case based on the total weight of the polymer blend.

The propylene homopolymer employed as or in component I comprises predominantly that least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The homopolymer of component I or the homopolymer present therein generally has a melt-flow index from about 0.5 g/10 min to 15 g/10 min, preferably from about 1.5 g/10 min to 6 g/10 min, at 230° C. and a force of 21.6N (DIN 53 735).

Component II of the interlayer mixture or blend essentially comprises an HDPE or a blend essentially comprising HDPE as component A and a component B.

For the purposes of the present invention, HDPE is defined as high-pressure polyethylenes which have the following properties:

1. The melt-flow index MFI, measured in accordance with DIN 53 735 or ISO 1133 at 50N/190° C., is in the range from greater than about 1 to 50 g/10 min, preferably from about 5 to 45 g/10 min, particularly from about 5 to 25 g/10 min.
2. The viscosity index, measured in accordance with DIN 53 728, Part 4, or ISO 1191, is in the range from about 100 to 450 cm$^3$/g, preferably from about 120 to 280 cm$^3$/g.
3. The crystallinity is from about 35 to 80%, preferably from about 50 to 80%.
4. The density, measured at 23° C. in accordance with DIN 53 479, Method A, or ISO 1183, is in the range from about 0.93 to 0.97 g/cm$^3$, preferably from about 0.95 to 0.96 g/cm$^3$.
5. The melting point, measured by a differential scanning calorimeter (DSC) (maximum of the melting curve, heating rate 20° C./min) is between about 120° and 150° C., preferably between about 125° and 135° C.

The HDPE as component II and HDPE as blend component A is selected from the above-described polyethylenes, so that the same HDPE as blend component A is in principle suitable as component II, but they need not be identical.

Blend component B comprises
a propylene homopolymer or
a copolymer of
ethylene and propylene or
ethylene and butylene or
propylene and butylene or
ethylene and another α-olefin having 5 to 10 carbon atoms or
propylene and another α-olefin having 5 to 10 carbon atoms or
a terpolymer of
ethylene and propylene or butylene or
ethylene and propylene or another α-olefin having 5 to 10 carbon atoms or
a mixture of two or more of said homopolymers, copolymers and terpolymers or
a blend of two or more of said homopolymers, copolymers and terpolymers.

In a preferred embodiment, blend component B comprises
a propylene homopolymer or
a copolymer of
ethylene and propylene or
ethylene and 1-butylene or
propylene and 1-butylene or
a terpolymer of
ethylene and propylene and 1-butylene or
a mixture of two or more of said homopolymers, copolymers and terpolymers or
a blend of two or more of said homopolymers, copolymers and terpolymers,
with particular preference being given to propylene homopolymers or random ethylene-propylene copolymers having
an ethylene content from about 2 to 10% by weight, preferably from about 5 to 8% by weight, or random propylene-1-butylene copolymers having
a butylene content from about 4 to 25% by weight, preferably from about 10 to 20% by weight,
in each case based on the total weight of the copolymer,
or random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
in each case based on the total weight of the terpolymer,
or a blend of an ethylene-propylene-1-butylene terpolymer and a propylene-1-butylene copolymer having an ethylene content from about 0.1 to 7% by weight
and a propylene content from about 50 to 90% by weight
and a 1-butylene content from about 10 to 40% by weight,
in each case based on the total weight of the polymer blend.

The propylene homopolymer employed as or in blend component B comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The homopolymer of blend component B or the homopolymer present therein generally has a melt-flow index from about 0.5 g/10 min to 15 g/10 min, preferably from about 1.5 g/10 min to 6 g/10 min, at 230° C. and a force of 21.6N (DIN 53 735).

The ratio (weight ratio) between the two blend components A and B is from about A:B=20:80 to A:B=80:20, preferably from about A:B=40:60 to A:B=60:40, with about A:B=45:55 being particularly preferred.

The blend of components A and B has a melt-flow index (DIN 53 735 at 230° C. and a load of 21.6N) from about 1.5 g/10 min to 12 g/10 min, preferably from about 2.5 g/10 min to 6 g/10 min, with the melt-flow index of the blend preferably being higher than that of the propylene polymer of the base layer.

The melting range of the blend is between about 100° and 160° C., preferably between about 120° and 150° C.

The ratio (weight ratio) between the two components I and II of the interlayer mixture or blend can vary within broad limits and depends on the intended application of the multilayer film. The ratio between components I and II is preferably in the range from about I:II=10:90 to I:II=90:10, preferably between about I:II=30:70 to I:II=70:30, particularly about I:II=50:50.

The above-described interlayer of the multilayer film according to the invention can, in a further embodiment, additionally contain fillers, i.e., solid particles and/or pigments, which are incompatible with the interlayer mixture or blend.

The addition of these fillers in the interlayer generally does not result in the formation of vacuole-like cavities. This means that the filler-containing interlayer is essentially vacuole-free. For homopolymer-containing interlayers containing fillers, the proportion of homopolymer to the total polymer content of the interlayer should correspondingly be kept low, particularly if solid particles having a mean particle diameter of about >1 μm are present. The homopolymer proportion should in this case not exceed about 25% by weight and is preferably in the range from about 5 to 20% by weight, in each case based on the interlayer. For filler-containing interlayers having a homopolymer portion of greater than 25% by weight, based on the interlayer, smaller mean particle diameter fillers must be selected. Preferably the fillers for high homopolymer portions essentially comprise only pigments.

Suitable fillers for the interlayer according to the present invention are in principle the filler types described above for the base layer, i.e., both the solid particles having a mean particle diameter of >1 μm, but which generate essentially no vacuoles in the interlayer, and/or the pigments whose mean particle diameter is generally from about 0.001 μm to 1 μm. As described above for the base layer, solid particles only, pigments only or solid particles and pigments in combination can be added to the interlayer.

Conventional fillers in the interlayer are inorganic and/or organic materials which are incompatible with polypropylene, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide. Calcium carbonate, silicon dioxide and titanium dioxide are especially preferred. Suitable organic fillers are conventional polymers which are incompatible with the polymer of the interlayer, particularly those such as LDPE, LLDPE, HDPE, polyesters, polystyrenes, polyamides and halogenated organic polymers, with polyesters such as polybutylene terephthalates especially preferred. For the purposes of the present invention, "incompatible materials or incompatible polymers" means that the material or polymer is in the form of a separate particle or a separate phase in the film.

For preferred embodiments with the interlayer containing $TiO_2$, the $TiO_2$ described above for the base layer is used.

The amount of filler in the interlayer is up to about 30% by weight and is generally in the range from about 1 to 25% by weight, preferably in the range from about 3 to 15% by weight, most preferably in the range from about 4 to 12% by weight, in each case based on the interlayer.

Films provided with only pigment in the interlayer generally contain this pigment in an amount from about 2 to 25% by weight, preferably from about 3 to 20% by weight, more preferably from about 5 to 15% by weight, in each case based on the interlayer. Preferred pigments are white pigments, particularly $TiO_2$ and $BaSO_4$. $TiO_2$ preferably has a mean particle diameter from about 0.01 to 0.7 μm, more preferably from about 0.1 to 0.5 μm.

Films provided with only solid particles in the interlayer generally contain these particles in an amount from about 1 to 25% by weight, preferably from about 1 to 20% by weight, in each case based on the interlayer. Preferred solid particles are $CaCO_3$, $SiO_2$, polyamides and polybutylene terephthalates. $CaCO_3$ having a mean particle size from about 1 to 5 μm is especially preferred.

Films provided with both solid particles and with pigment in the interlayer ,contain the solid particles in an amount from about 1 to 20% by weight, preferably from about 1 to 15% by weight, most preferably from about 1 to 12% by weight. The pigments are present in an amount from about 1 to 20% by weight, preferably from about 1 to 15% by weight, most preferably from about 1 to 12% by weight. For such film types, a combination of $CaCO_3$ as solid particles and $TiO_2$ as pigment is preferred.

The interlayer may furthermore contain a low-molecular-weight resin. In principle, the same resins as described for the base layer are used, the amounts employed correspond to those employed in the base layer.

The opaque, matte multilayer film has, according to the invention, an outer layer which is applied to the above-described interlayer.

The outer layer comprises a propylene homopolymer or a copolymer of
 ethylene and propylene or
 ethylene and butylene or
 propylene and butylene or
 ethylene and another α-olefin having 5 to 10 carbon atoms or
 propylene and another α-olefin having 5 to 10 carbon atoms or a terpolymer of
 ethylene and propylene or butylene or
 ethylene and propylene or another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

In a preferred embodiment, the outer layer comprises a propylene homopolymer or a copolymer of
 ethylene and propylene or
 ethylene and 1-butylene or
 propylene and 1-butylene or a terpolymer of
 ethylene and propylene and 1-butylene or a mixture of two or more of said particularly preferred homopolymers, copolymers and terpolymers or a blend of two or more of said particularly preferred homopolymers, copolymers and terpolymers, if desired mixed with one or more of said homopolymers, copolymers and terpolymers, with particular preference being given to propylene homopolymers or random ethylene-propylene copolymers having
 an ethylene content from about 2 to 10% by weight, preferably from about 5 to 8% by weight, or random propylene-1-butylene copolymers having
 a butylene content from about 4 to 25% by weight, preferably from about 10 to 20% by weight, in each case based on the total weight of the copolymer, or random ethylene-propylene-1-butylene terpolymers having
 an ethylene content from about 1 to 10% by weight, preferably from about 2 to 6% by weight, and
 a 1-butylene content from about 3 to 20% by weight, preferably from about 8 to 10% by weight,
 in each case based on the total weight of the terpolymer, or a blend of an ethylene-propylene-1-butylene terpolymer and a propylene-1-butylene copolymer having an ethylene content from about 0.1 to 7% by weight
 and a propylene content from about 50 to 90% by weight
 and a 1-butylene content from about 10 to 40% by weight, in each case based on the total weight of the polymer blend.

The propylene homopolymer employed as or in the outer layer comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The homopolymer of the outer layer or the homopolymer present therein generally has a melt-flow index from about 0.5 g/10 min to 15 g/10 min, preferably from about 1.5 g/10 min to 6 g/10 min, at 230°C. and a force of 21.6N (DIN 53 735).

The film according to the present invention has at least three layers and always contains, as essential layers, the base layer C and at least one interlayer I and at least one outer layer O in the structure CIO. The choice of the number of layers depends primarily on the intended use of the film. Particular preference is given to four- and five-layered embodiments having the structure OICIO or the asymmetrical structure OCIO or ICIO which has an "interlayer" on the outside.

The overall thickness of the film can vary within broad limits and depends on the intended application of the film. The preferred embodiments of the film according to the present invention have overall thicknesses from about 10° to 120° μm, preferably from about 20 to 100 μm, particularly from about 30 to 100 μm.

The thickness of the interlayer(s) are independent of one another, and range from about 2 to 12 μm, preferably from about 3 to 8 μm, particularly from about 3 to 6 μm. The values stated in each case relate to one interlayer.

The thickness of the outer layer(s) is greater than about 0.4 μm and is preferably in the range from about 0.8 to 4 μm, particularly from about 1 to 3 μm. The outer layers on both sides can have identical or different thicknesses.

Preferred embodiments of the multilayer film have four or five layers. The structure, thickness and composition of a second interlayer or outerlayer can be selected independently of the matte (first) interlayer according to the present invention which is already present. The second interlayer preferably comprises one of the above-described mixtures, but is not necessarily identical to that of the first interlayer. The second outer layer also selected from those described above, but independently of those already present.

In order to improve the adhesion properties of the outer layer(s), at least one surface of the film is corona or flame-treated. If desired, the corresponding treatment can be carried out on both surfaces and can be the same or different.

It has been found that incorporation of the above-described polyethylenes into a propylene homopolymer, propylene copolymer or propylene terpolymer interlayer surprisingly allows a very homogeneous film appearance while achieving the desired matte characteristics. surprisingly, the matte appearance of the film is retained in spite of the outer layer applied. This result is particularly surprising since the conventional outer layers known per se made from propylene homopolymers, propylene copolymers, propylene terpolymers are glossy to highly glossy. It would therefore have been expected that the matte appearance of the film could be considerably impaired by the glossy outer layer.

In order further to improve specific properties of the polyolefin film according to the present invention, both the base layer and the outer layer(s) may contain further additives in an effective amount in each case, preferably antiblocking agents and/or antistatics and/or lubricants and/or stabilizers and/or neutralizers. All amount data hereinafter in percent by weight (% by weight) in each case relate to the layer or layers to which the additive can be added.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from about 0.1 to 2% by weight, preferably from about 0.1 to 0.5% by weight. The mean particle size is between about 1 and 6 µm, particularly about 2 and 5 µm. Particles having a spherical shape, such as those described in EP-A-0 236 945 and DE-A-38 01 535, are particularly suitable. The antiblocking agents are preferably added to the outer layers.

Preferred antistatics are alkali metal alkanesulfonates, polyether-modified, i.e., ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by $\omega$-hydroxy-$(C_1$-$C_4)$alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range of about 0.05 to 0.5% by weight. Furthermore, glycerol monostearate is preferably employed as antistatic, in an amount from about 0.03% to 0.2%.

Lubricants are higher aliphatic acid amides, higher aliphatic acid esters, waxes and metal soaps and polydimethylsiloxanes. The effective amount of lubricant is in the range of about 0.1 to 3% by weight. Particularly suitable is the addition of higher aliphatic acid amides in the range of about 0.15 to 0.25% by weight in the base layer and/or the outer layers. A particularly suitable aliphatic acid amide is erucamide.

The addition of polydimethylsiloxanes is preferably in the range of about 0.3 to 2.0% by weight. Polydimethylsiloxanes having a viscosity from about 10,000 to 1,000,000 $mm^2/s$ are particularly preferred. Polydimethylsiloxanes are preferably added in one or both outer layers.

Stabilizers which can be employed are conventional compounds which have a stabilizing action for polymers of ethylene, propylene and other $\alpha$-olefins. They are added in an amount between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, particularly from about 0.15 to 0.3% by weight, and having a molecular weight of greater than 500 g/mol. Pentaerythrityl tetrakis[3-(3,5-di-tert-butyl-4-hydroxyphenyl) propionate] and 1,3,5-trimethyl-2,4,6-tris (3,5-di-tert-butyl-4-hydroxybenzyl)benzene are particularly advantageous.

Neutralizers are preferably calcium stearate and/or calcium carbonate and/or synthetic dihydrotalcite (SHYT) having a mean particle size of at most about 0.7 µm, an absolute particle size of less than about 10 µm and a specific surface area of at least about 40 $m^2/g$.

The invention furthermore relates to a process for the production of the multilayer film according to the invention by the coextrusion process, which is known per se. This process is carried out by coextruding the melts corresponding to the individual layers of the film through a flat-film die, taking off the resultant film over one or more rolls for solidification, subsequently biaxially stretching (orienting) the film, heat setting the biaxially stretched film and, if desired, corona-treating the surface layer intended for corona treatment.

The biaxial stretching (orientation) is generally carried out consecutively. Consecutive biaxial stretching, in which stretching is carried out first longitudinally (in the machine direction) and then transversely (perpendicular to the machine direction), is preferred.

As is conventional in the coextrusion process, the polymer or polymer mixture of the individual layers is compressed and liquefied in an extruder, it being possible for any additives and/or fillers to be already present in the polymer or in the polymer mixture or added at this time. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. Stretching is preferably from about 4:1 to to 7:1 in the longitudinal direction and preferably from about 8:1 to 11:1 in the transverse direction. The longitudinal stretching is expediently carried out witch the aid of two rolls running at different speeds corresponding to the desired stretching ratio, and the transverse stretching is expediently carried out with the aid of an appropriate tenter frame.

Biaxial stretching of the film is followed by thermofixing (heat treatment), with the film being kept at a temperature from about 140° to 160° C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of about 20° to 100° C., preferably from about 40° to 60° C., by means of a heating and cooling circuit.

The temperatures at which longitudinal and transverse stretching are carried out can vary in a relatively broad range and depend on the respective composition of the individual layers and on the desired properties of the film or base layer, such as, for example, opacity, whiteness, thickness, density, etc. Generally, the longitudinal stretching is preferably carried out at about 120° to 150° C. and the transverse stretching preferably at about 155° to 190° C.

If desired, one or both surfaces of the film can, as mentioned above, be corona or flame-treated by one of the known methods after the biaxial stretching. The treatment intensity is generally in the range from about 37 to 42 mN/m, preferably from about 38 to 40 mN/m.

In the case of corona treatment an expedient procedure is to pass the film between two conductor elements serving as electrodes. A high voltage, usually alternating voltage (from about 5 to 20 kV and from about 5 to 30 kHz), is applied between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000 V, preferably in the range from about 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer in this treatment is substantially less than in the case of standard flame treatment, and films can be obtained in which the heat-sealing properties of the treated side are even better than those of the untreated side.

The multilayer film according to the invention is distinguished by a very homogeneous and characteristic matte appearance in combination with superior, constant surface properties.

The matte appearance of the film gives the film a paper-like appearance which is particularly desirable for certain applications in the packaging sector. Surprisingly, it has been found that it is not just the minimization of gloss that brings the desired optical effect, but rather a balanced optimization of the properties is necessary, which is surprisingly possible by means of the specific interlayer composition as described in the present invention.

Surprisingly, the matte appearance of the film is retained even with the outer layer, which is glossy per se. With this combination, it is possible to combine the matte appearance of the HDPE-containing layer according to the present invention with the advantageous surface properties of conventional outer layers. The film has good passage through the machine and good running properties, and even has good heat-sealing properties if desired. The film is highly suitable for corona or flame treatment and is readily printable. In addition, it is highly suitable for lamination due to its good adhesion properties. The film exhibits little abrasion and has good sliding properties.

The film structure, with the conventional outer layer and the present invention's interlayer, offers particular advantages with respect to its wide range of possibilities for variation. Surprisingly, the film's appearance is determined predominantly by the interlayer of the present invention, which allows the film manufacturer to provide the processor with films having very different appearances, but with the same surface characteristics. This means that the processor can easily change from one film to another without having to reset the processing conditions every time. This results in significant economic advantages.

Surprisingly, it should be noted that the multilayer film according to the present invention is distinguished by a multiplicity of advantageous properties, in particular by a characteristic matte sheen of less than 80 at a measurement angle of 85° (ASTM-D-523-78), a particularly uniform matte film appearance, good surface properties, good long-term stability of the surface tension, and the possibility for optical variation with constant surface properties.

This surprising multiplicity of excellent properties provides a film according to the present invention which is equally highly suitable for a wide variety of applications such as: an attractive matte lamination film; as an opaque packaging film in high-speed packaging machines; as an opaque cigarette wrapping film; or as an opaque film for the labeling process, such as in-mold labeling.

In addition, the film is highly suitable as a base film for adhesive tape (with long-term stability and high surface tension) or as a base film for aqueous barrier coating systems, for example base film for aqueous dispersions of polyvinylidene chloride or ethylene vinyl alcohol copolymers. It can also be printed with aqueous printing inks, for which it has excellent short-term and long-term printability. Due to its superior short term and long-term coating properties, the film is also suitable for the production of plastic labels, particularly those used in the in-mold labeling process. In addition, the film is also suitable for the production of laminates with paper, cardboard, metals, metallized plastic films and plastic films.

The invention is now described in greater detail with reference to the following working examples.

Example 1

A four-layer film with a thickness of 1.4 mm has a layer structure ABCD. The interlayer C was applied to one surface of the base layer B and an outer layer A was applied to the other surface of the base layer B. The film was extruded by the coextrusion process from a flat-film die at an extrusion temperature of 260° C. An outer layer D different from A was applied to the interlayer C.

The outer layer D had been corona-treated.

The essential components of the base layer were:

| 92.6% by weight | of propylene homopolymer (PP) having an n-heptane-soluble content of 4.5% by weight (based on 100% of PP) and a melting point of 165° C.; the melt-flow index of the propylene homopolymers is 3.2 g/10 min and 230° C. and 230° C. and a load of 21.6N (DIN 53 735); |
|---|---|
| 4.2% by weight | of $CaCO_3$ of the •Omyalithe 90T type, supplier for Masterbatches Multibase, Z. I. du Giers, F-38380 Saint-Laurent-duPont, France; |
| 3.2% by weight | of $TiO_2$ via Masterbatch •P 8555 LM, supplied by Schulman GmbH, Hüttenstraße 211, D-5014 Kerpen 3, Germany. |

The interlayer C comprised a mixture of two components I and II. Component I was a terpolymer comprising ethylene, propylene and 1-butylene units, having an ethylene content of 1.9% by weight and a 1-butylene content of 8.4% by weight, based on the terpolymer. The melt-flow index (MFI) (21.6N/230° C.) was 6.5 g/10 min. Component II was an HDPE having an MFI (50N/190° C.) of 11 g/10 min (measured in accordance with DIN 53 735), a viscosity index of 160 $cm^3/g$ (measured in accordance with DIN 53 728, Part 4), a density of 0.954 $g/cm^3$ (measured in accordance with DIN 53 479, Method A), a degree of crystallization of 68% and a melting point of 132° C., measured by DSC. The proportion of the two components I and II in the composition of the interlayer was 50% by weight each.

The two components were mechanically mixed for 2 minutes at 500 rpm in a Henschel mixer in the 1:1 ratio to give a homogeneous granule mixture, before processing in the extruder.

The outer layer D comprised a terpolymer comprising ethylene, propylene and 1-butylene units, having an ethylene content of 1.9% by weight and a 1-butylene content of 8.4% by weight, based on the terpolymer. The melt-flow index (21.6N/230° C.) was 6.5 g/10 min.

The outer layer A comprised a random ethylenepropylene copolymer having an ethylene content of 5% by weight, based on the weight of the copolymer. The melting point of the copolymer was 134° C., and the melt-flow index (21.6N/230° C.) was 7.0 g/10 min.

All layers contained 0.12% by weight of pentaerythrityl tetrakis[4-(3,5-di-tert-butyl-4 -hydroxyphenyl)-propionate] (Irganox• 1010) as a stabilizer and 0.06% by weight of calcium stearate as a neutralizer. The base layer furthermore. contained 0.15% by weight of N,N-bis(2-hydroxyethyl)($C_{10}$–$C_{20}$)alkylamine (Armostat•300) as antistatic.

After coextrusion, the extruded four-layer film was taken off over a first take-off roll and a further trio of rolls. The film was then cooled, subsequently stretched longitudinally, stretched transversely, set and corona-treated. The following conditions in detail were selected:

| Extrusion: | Extrusion temperature 260° C. |
| --- | --- |
| | Temperature of the first take-off roll 50° C. |
| | Temperature of the trio of rolls 50° C. |
| Longitudinal stretching: | Stretching roll T = 125° C. |
| | Longitudinal stretching by a factor of 5 |
| Transverse stretching: | Heat-up zones T = 175° C. |
| | Stretching zones T = 165° C. |
| | Transverse stretching by a factor of 10 |
| Setting: | Temperature T = 155° C. |
| Corona treatment: | Voltage: 10,000 V |
| | Frequency: 10,000 Hz |

The multilayer film produced in this way had a surface tension from 40 to 41 mN/m (D side) directly after production. The film was about 28 μm thick, the thickness of the outer layer A and the outer layer D was about 0.9 μm, the interlayer C was about 3.5 μm and the base layer was about 22.7 μm.

Example 2

Example 1 was repeated. Only the composition of the interlayer C was modified as follows:

the terpolymer used in the interlayer C in Example 1 was 70% by weight in this example;

the HDPE used in the interlayer C in Example 1 was 30% by weight.

Example 3

Example 1 was repeated. The composition of the interlayer C was modified as follows:

the copolymer used in the outer layer A in Example was 50% by weight in this example;

the HDPE used in the interlayer C in Example 1 was 50% by weight.

The composition of the outer layer D was modified as follows:

the copolymer used in the outer layer A in Example was 100% by weight in this example.

Example 4

Example 3 was repeated. Only the composition of the interlayer C was modified as follows:

the HDPE used in the interlayer C in Example 1 was 30% by weight in this example;

the copolymer used in the outer layer A in Example 1 was 70% by weight.

Example 5

Example 3 was repeated. Only the composition of the interlayer C was modified as follows:

the HDPE used in the interlayer C in Example 1 was 30% by weight in this example;

the homopolymer used in the base layer B in Example 1 was 70% by weight.

Example 6

Example 5 was repeated. Only the composition of the outer layer D was modified as follows:

the homopolymer used in the base layer in Example 1 was 100% by weight in this example.

Example 7

Example 1 was repeated. Only the composition of the interlayer C was modified as follows:

the terpolymer used in the interlayer C in Example 1 was 43.7% by weight in this example;

the HDPE used in the interlayer C in Example 1 was 43.7% by weight;

the $TiO_2$ used in the base layer B in Example 1 was 7.0% by weight;

the polypropylene used in the base layer B in Example 1 was 5.6% by weight.

Example 8

Example 1 was repeated. Only the composition of the interlayer C was modified as follows:

the terpolymer used in the interlayer C in Example 1 was 47.5% by weight in this example;

the HDPE used in the interlayer C in Example 1 was 47.5% by weight;

the $CaCO_3$ used in the base layer B in Example 1 was 5.0% by weight.

Example 9

Example 1 was repeated. Only the composition of the interlayer C was modified as follows:

the terpolymer used in the outer D in Example 1 was 46.3% by weight in this example;

the HDPE used in the interlayer C in Example 1 was 46.3% by weight;

the $CaCO_3$ used in the base layer B in Example 1 was 4.2% by weight;

the $TiO_2$ used in the base layer B in Example 1 was 3.2% by weight.

Example 10

Example 1 was repeated. Only the composition of the base layer B was modified as follows:

the homopolymer used in the base layer B in Example 1 was 95% by weight in this example;

the $CaCO_3$ used in the base layer B in Example 1 was 5% by weight.

Example 11

Example 1 was repeated. Only the composition of the base layer B was modified as follows:

the homopolymer used in the base layer B in Example 1 was 92% by weight in this example;

the $TiO_2$ used in the base layer B in Example 1 was 8% by weight.

Comparative Example 1

Example 7 was repeated, but as a three-layer film without an outer layer D.

Comparative Example 2

Example 8 was repeated, but as a three-layer film without an outer layer D.

Comparative Example 3

Example 1 was repeated, but as a three-layer film without an interlayer C.

The raw materials and films were characterized using the following measurement methods:

Melt-flow index

The melt-flow index was measured in accordance with DIN 53 735 at a load of 21.6N and 230° C. or at a load of 50N and 190° C.

Melt-flow index

The viscosity index is a measure of the molecular weight. The viscosity index is measured in accordance with DIN 53 728, Part 4, in 0.1% strength decahydronaphthalene solution at 135° C.

Density σ

The density is determined in accordance with DIN 53 479, Method A.

Degree of crystallization α

The degree of crystallization can be determined from the following equation:

$$\alpha = \frac{\sigma - \sigma_{amorphous}}{\sigma_{crystalline} - \sigma_{amorphous}} \cdot 100\%$$

where $\sigma_{amorphous} = 0.8549$ g/cm$^3$
$\sigma_{crystallic} = 1.0005$ g/cm$^3$
σ=density of the HDPE grade employed.

Gloss

The gloss was determined in accordance with DIN 67 530. The reflection value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Seal seam strength

Following the determination, two film strips 15 mm in width were placed one on top of the other and heat-sealed at 130° C. for 0.5 second at a pressure of 10N/cm$^2$ (equipment used: Brugger NDS with sealing jaws heated on the one side). The seal seam strength was determined by the T-peel method.

Roughness

The roughness was determined according to DIN 4768.

Friction

The friction was determined in accordance with DIN 53 375.

Surface tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removed, it was assessed as being poor.

Water-vapor barrier action

The water-vapor barrier action was measured in accordance with DIN 53 122 at 23° C. and 85% relative atmospheric humidity. This test indicates the amount of water in grams which has passed through per square meter and per day.

Opacity and whiteness

The opacity and whiteness are determined with the aid of an "ELREPHO" electric remission photometer from Zeiss, Oberkochen (DE), standard, illuminant C, 2° standard observer. The opacity is determined in accordance with DIN 53 146. The whiteness is defined as W=RY+3RZ−3RX, where W=whiteness, RY, RZ and RX=corresponding reflection factors when the Y, Z and X color measurement filters respectively are used. The white standard used is a barium sulfate compact (DIN 5033, Part 9). A detailed description is given, for example, in Hansl Loos, "Farbmessung"[Color Measurement], Verlag Beruf und Schule, Itzehoe, 1989.

Light transparency

The light transparency is measured in accordance with ASTM-D 1003-77.

Tables 1 and 2 below show the properties and structure of the multilayer polypropylene films of the examples and comparative examples.

TABLE 1

| Example | Base layer B | Interlayer C | Outer layer A | Outer layer D |
|---|---|---|---|---|
| E1 | 92.6% by wt. of PP; 4.2% by wt. of CaCO$_3$; 3.2% by wt. of TiO$_2$ | 50% by wt. of terpolymer; 50% by wt. of HDPE | 100% by wt. of copolymer | 100% by wt. of terpolymer |

TABLE 1-continued

| Example | Base layer B | Interlayer C | Outer layer A | Outer layer D |
|---|---|---|---|---|
| E2 | as Example 1 | 70% by wt. of terpolymer; 30% by wt. of HDPE | 100% by wt. of copolymer | 100% by wt. of terpolymer |
| E3 | as Example 1 | 50% by wt. of copolymer; 50% by wt. of HDPE | 100% by wt. of copolymer | 100% by wt. of copolymer |
| E4 | as Example 1 | 70% by wt. of copolymer; 30% by wt. of HDPE | 100% by wt. of copolymer | 100% by wt. of copolymer |
| E5 | as Example 1 | 70% by wt. of homopolymer; 30% by wt. of HDPE | 100% by wt. of copolymer | 100% by wt. of copolymer |
| E6 | as Example 1 | 70% by wt. of homopolymer; 30% by wt. of HDPE | 100% by wt. of copolymer | 100% by wt. of homopolymer (non-heat-sealable) |
| E7 | as Example 1 | 43.7% by wt. of terpolymer; 43.7% by wt. of HDPE; 7.0% by wt. of $TiO_2$; 5.6% by wt. of PP | 100% by wt. of copolymer | 100% by wt. of terpolymer |
| E8 | as Example 1 | 47.5% by wt. of terpolymer; 47.5% by wt. of HDPE 5.0% by wt. of $CaCO_3$ | 100% by wt. of copolymer | 100% by wt. of terpolymer |
| E9 | as Example 1 | 46.3% by wt. of terpolymer; 46.3% by wt. of HDPE; 4.2% by wt. of $CaCO_3$; 3.2% by wt. of $TiO_2$ | 100% by wt. of copolymer | 100% by wt. of terpolymer |
| E10 | 95% by wt. of PP; 5% by wt. of $CaCO_3$ | 50% by wt. of terpolymer; 50% by wt. of HDPE | 100% by wt. of copolymer | 100% by wt. of terpolymer |
| E11 | 92% by wt. of PP; 8% by wt. of $TiO_2$ | 50% by wt of terpolymer; 50% by wt. of HDPE | 100% by wt. of copolymer | 100% by wt. of terpolymer |
| CE1 | as Example 1 | | 100% by wt. of copolymer | 43.7% by wt. of terpolymer; 43.7% by wt. of HDPE; 7.0% by wt. of $TiO_2$; 5.6% by wt. of PP |
| CE2 | as Example 1 | | 100% by wt. of copolymer | 47.5% by wt. of terpolymer; 47.5% by wt. of HDPE; 5.0% by wt. of $CaCO_3$ |
| CE3 | as Example 1 | | 100% by wt of copolymer | 100% by wt. of terpolymer |

E = Example; CE = Comparative Example
Result:
CE1 "chalks" on rolls
CE2 "chalks" on rolls and absorbs a particularly large amount of ink!?

TABLE 2

| Example | Gloss 85°, D side | Coefficient of friction | Visual assessment (matte appearance) | Whiteness D side | Opacity D side | Density | Print quality |
|---|---|---|---|---|---|---|---|
| E1 | 45 | 0.6 | ++ | 74 | 69 | 0.78 | ++ |
| E2 | 47 | 0.5 | ++ | 74 | 69 | 0.78 | ++ |
| E3 | 50 | 0.5 | ++ | 75 | 70 | 0.78 | ++ |
| E4 | 52 | 0.5 | ++ | 74 | 69 | 0.77 | ++ |
| E5 | 53 | 0.6 | ++ | 74 | 69 | 0.78 | ++ |
| E6 | 55 | 0.5 | ++ | 74 | 69 | 0.78 | ++ |
| E7 | 40 | 0.4 | ++ | 77 | 70 | 0.80 | ++ |
| E8 | 38 | 0.5 | ++ | 76 | 70 | 0.78 | ++ |
| E9 | 40 | 0.5 | ++ | 79 | 73 | 0.79 | ++ |
| E10 | 45 | 0.5 | ++ | 65 | 67 | 0.69 | ++ |
| E11 | 45 | 0.6 | ++ | 81 | 64 | 0.94 | ++ |
| CE1 | 34 | 0.5 | ++ | 77 | 70 | 0.78 | − |
| CE2 | 29 | 0.5 | ++ | 75 | 70 | 0.78 | + |
| CE3 | 84 | 0.5 | — | 77 | 70 | 0.78 | ++ |

E = Example;
CE = Comparative Example

What is claimed is:

1. An opaque, multilayer polypropylene film having at least one matte surface comprising at least one base layer containing polypropylene or a polypropylene mixture and fillers, at least one interlayer and at least one outer layer applied to the interlayer;

said outer layer is selected from the group consisting of a propylene homopolymer, copolymers of α-olefins having 2 to 10 carbon atoms, terpolymers of α-olefins having 2 to 10 carbon atoms, a mixture of two or more said homopolymers, copolymers and terpolymers, a blend of two or more said homopolymers, copolymers and terpolymers, and a blend of two or more said homopolymers, copolymers and terpolymers mixed with one or more said homopolymers, copolymers and terpolymers;

said interlayer comprises a mixture or blend of two components I and II, wherein component I is selected from the group consisting of a propylene homopolymer, a copolymer of α-olefins having 2 to 10 carbon atoms, a terpolymer of α-olefins having 2 to 10 carbon atoms, a mixture of two or more said homopolymers, copolymers and terpolymers, and a blend of two or more said homopolymers, copolymers and terpolymers, component II is selected from the group consisting of high-density polyethylene (HDPE) and a blend of two components A and B, wherein blend component A is essentially an HDPE and blend component B is selected from the group consisting of one or more polymers selected from the group consisting of propylene homopolymers, copolymers of α-olefins having 2 to 10 carbon atoms, terpolymers of α-olefins having 2 to 10 carbon atoms, a mixture of two or more said homopolymers, copolymers and terpolymers, and a blend of said homopolymers, copolymers and terpolymers.

2. A multilayer polypropylene film as claimed in claim 1, wherein component I is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene,
mixtures or blends thereof, and
a blend of two or more of said homopolymers, copolymers and terpolymers, mixed with one or more of said homopolymers, copolymers and terpolymers; and blend component B is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene,
a mixture of two or more said homopolymers, copolymers and terpolymers, and
a blend of two or more of said homopolymers, copolymers and terpolymers.

3. A multilayer polypropylene film as claimed in claim 2, wherein component I is selected from the group consisting of
propylene homopolymers,
random ethylene-propylene copolymers having an ethylene content from about 2 to 10% by weight,
random propylene-1-butylene copolymers having
a butylene content from about 4 to 25% by weight, in each case based on the total weight of the copolymer,
random ethylene-propylene-1-butylene terpolymers having an ethylene content from about 1 to 10% by weight, and
a 1-butylene content from about 3 to 20% by weight in each case based on the total weight of the terpolymer, and
a blend of an ethylene-propylene-1-butylene terpolymer and a propylene-1-butylene copolymer having an ethylene content from about 0.1 to 7% by weight
and a propylene content from about 50 to 90% by weight
and a 1-butylene content from about 10 to 40% by weight,
in each case based on the total weight of the polymer blend; and blend component B is selected from the group consisting of
propylene homopolymers,
random ethylene-propylene copolymers having an ethylene content from about 2 to 10% by weight,
random propylene-1-butylene copolymers having
a butylene content from about 4 to 25% by weight, in each case based on the total weight of the copolymer,
random ethylene-propylene-1-butylene terpolymers having
an ethylene content from about 1 to 10% by weight, and
a 1-butylene content from about 3 to 20% by weight, in each case based on the total weight of the terpolymer, and
a blend of an ethylene-propylene-1-butylene terpolymer and a propylene-1-butylene copolymer having an ethylene content from about 0.1 to 7% by weight
and a propylene content form about 50 to 90% by weight
and a 1-butylene content from about 10 to 40% by weight,
in each case based on the total weight of the polymer blend.

4. A multilayer polypropylene film as claimed in claim 1 wherein the HDPE has an MFI of about greater than 1 to 50 g/10 min, viscosity index of from about 100 to 450 $cm^3$/g, a density from, about 0.93 to 0.97 $g/cm^3$, a degree of crystallization from about 35 to 80% and a melting point of about 120° to 150° C.

5. A multilayer polypropylene film as claimed in claim 1, wherein the ratio between blend components A and B is in the range from about A:B=20:80 to A:B=80:20.

6. A multilayer polypropylene film as claimed in claim 1 wherein the blend of components A and B has a melt-flow index from about 1.5 to 12 g/10 min.

7. A multilayer polypropylene film as claimed in claim 1, wherein the ratio between components I and II is in the range from about I:II=90:10 to I:II=10:90.

8. A multilayer polypropylene film as claimed in claim 1, wherein the propylene polymer of the base layer has a melting point of at least about 140° C. and the melt-flow index is in the range from about 0.5 to 15 g/10 min.

9. A multilayer polypropylene film as claimed in claim 1, wherein the fillers of the base layer comprises one or more of vacuole-inducing solid particles and pigments.

10. A multilayer polypropylene film as claimed in claim 9, wherein the solid particles comprise $CaCO_3$ or incompatible polymers, and the pigments comprise $TiO_2$.

11. A multilayer polypropylene film as claimed in claim 9, wherein the solid particles have a mean particle diameter of about >1 μm and the pigments have a mean particle diameter of about <1 μm.

12. A multilayer polypropylene film as claimed in claim 1, wherein the fillers of the base layer only consist of pigments, in an amount from about 2 to 25% by weight, and the density of the film is about <0.9 $g/cm^3$.

13. A multilayer polypropylene film as claimed in claim 1, wherein the fillers of the base layer only consist of solid particles, in an amount from about 1 to 25% by weight, and the density of the film is from about 0.4 to 0.85 $g/cm^3$.

14. A multilayer polypropylene film as claimed in claim 13, wherein the solid particles are present in the base layer in an amount from about 2 to 5% by weight, and the density is from about 0.7 to 0.85 $g/cm^3$.

15. A multilayer polypropylene film as claimed in claim 13, wherein the solid particles represent in the base layer in an amount from about 9 to 14% by weight, and the density of the film is from about 0.4 to 0.7 g/cm$^3$.

16. A multilayer polypropylene film as claimed in claim 1, wherein the fillers of the base layer comprise solid particles, in an amount from about 1 to 10% by weight and pigments, in an amount from about to 7% by weight, and the density of the film is from about 0.6 to 0.85 g/cm$^3$.

17. A multilayer polypropylene film as claimed in claim 1 wherein the interlayer further comprises one or more of solid particles and pigments as fillers.

18. A multilayer polypropylene film as claimed in claim 17, wherein the fillers of the interlayer only consist of solid particles in an amount from about 1 to 25% by weight which provides an essentially vacuole-free interlayer.

19. A multilayer polypropylene film as claimed in claim 18, wherein the solid particles comprise $CaCO_3$ or $SiO_2$.

20. A multilayer polypropylene film as claimed in claim 17 wherein the fillers of the interlayers only consist of pigments, in an amount from about 2 to 25% by weight.

21. A multilayer polypropylene film as claimed in claim 20, wherein the pigments comprise $TiO_2$.

22. A multilayer polypropylene film as claimed in claim 17, wherein the fillers of the interlayer comprise solid particles, in an amount from about 1 to 20% by weight and pigments in an amount from about 1 to 20% by weight.

23. A multilayer polypropylene film as claimed in claim 17, wherein component I of the interlayer is selected from the group consisting of a propylene homopolymer, a copolymer of ethylene and propylene, a copolymer of ethylene and 1-butylene, a copolymer of propylene and 1-butylene, a terpolymer of ethylene and propylene and 1-butylene or a mixture of two or more said homopolymers, copolymers and terpolymers.

24. A multilayer propylene film as claimed in claim 23, wherein component I of the interlayer is selected from the group consisting of propylene homopolymers, random ethylene-propylene copolymers having
an ethylene content from about 2 to 10% by weight,
random propylene-1-butylene copolymers having
a butylene content from about 4 to 25% by weight, in each case based on the total weight of the copolymer, random ethylene-propylene-1-butylene terpolymers having
an ethylene content from about 1 to 10% by weight, and
a 1-butylene content from about 3 to 20% by weight in each case based on the total weight of the terpolymer,
and a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight,
in each case based on the total weight of the polymer blend.

25. A multilayer polypropylene film as claimed in claim 1, wherein at least one of the outer layer and the base layer further comprises at least one additive selected from an antiblocking agent, an antistatic, a lubricant, a stabilizer, and a neutralizer.

26. A multilayer polypropylene film as claimed in claim 1, which has a gloss of less than 80 on the at least one matte surface.

27. A laminate comprising the multilayer polypropylene film as claimed in claim 1, laminated with a material selected from the group consisting of paper, cardboard, a metal, a metalized plastic film, and a plastic film.

28. A package article comprising the multilayer polypropylene film as claimed in claim 1, surrounding at least in part an article.

29. A coated barrier system comprising the polypropylene film as claimed in claim 1, and an aqueous coating.

30. A label comprising the multilayer polypropylene film as claimed in claim 1, shaped in the configuration of the label.

31. A multilayer polypropylene film as claimed in claim 1, produced by a process comprising the steps of:

coextruding the melts corresponding to the individual layers of the film through a flat-film die, taking the coextruded film off over a take-off roll whose temperature is between about 20° and 100° C., biaxially stretching the film at a longitudinal stretching ratio from about 4:1 to 7:1 and a transverse stretching ratio from about 8:1 to 11:1, heat-setting the biaxially stretched film, optionally corona-treating the heat-set film, and subsequently winding up the film, wherein the longitudinal stretching of the film is carried out at from 120° to 150° C. and the transverse stretching at from 155° to 190° C.

32. A multilayer polypropylene film as claimed in claim 25, wherein the outer layer further comprises at least one additive selected from an antiblocking agent, an antistatic, a lubricant, a stabilizer, and a neutralizer.

33. A multilayer polypropylene film as claimed in claim 25, wherein the base layer further comprises at least one additive selected from an antiblocking agent, an antistatic, a lubricant, a stabilizer, and a neutralizer.

34. An opaque, multilayer polypropylene film having at least one matte surface comprising at least one base layer containing polypropylene or a polypropylene mixture and fillers, at least one interlayer and at least one outer layer applied to the interlayer; said outer layer is selected from the group consisting of a propylene homopolymer, a copolymer of ethylene and propylene, a copolymer of ethylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixtures of blends thereof, and a blend of two or more said homopolymers, copolymers and terpolymers, mixed with one or more said homopolymers, copolymers and terpolymers;

said interlayer comprises a mixture or a blend of two components I and II, wherein component I is selected from the group consisting of a propylene homopolymer, a copolymer of ethylene and propylene, a copolymer of ethylene and butylene, a copolymer of propylene and butylene,
a copolymer of ethylene and another α-olefin having 5 to 10 carbon atoms,
a copolymer of propylene and another α-olefin having 5 to 10 carbon atoms
a terpolymer of ethylene and propylene and butylene,
a terpolymer of ethylene and propylene and another α-olefin having 5 to 10 carbon atoms
mixture or blends thereof, and
a blend of two or more said homopolymers, copolymers and terpolymers, mixed with one or more said homopolymers, copolymers and terpolymers,
and wherein component II is selected from the group consisting of
an HDPE or
a blend of two components A and B, wherein blend component A is
an HDPE and
blend component B is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms
mixtures or blends thereof.

* * * * *